Patented July 19, 1949

2,476,771

UNITED STATES PATENT OFFICE 2,476,771

PRODUCTION OF VINYL CYANIDE

Paul Lawrence Salzberg, Wilmington, Del., assignor to E. I. du Pont de Nemours & Company, Wilmington, Del., a corporation of Delaware No Drawing. Application May 30, 1945,
Serial No. 596,808

5 Claims. (Cl. 260—465.3)

The present invention relates to the synthesis of vinyl cyanide from acetylene and hydrogen cyanide in the presence of aqueous cuprous chloride complexes.

The synthesis of vinyl cyanide from acetylene and hydrogen cyanide with the aid of, as catalysts, aqueous acidic cuprous chloride complexes is well known. The cuprous chloride has been brought into solution with the aid of ammonium chloride, alkali metal chlorides such as potassium chloride and amine hydrochlorides such as ethanolamine hydrochloride. The acidity has been attained by means of strong mineral acids such as hydrochloric, sulfuric, phosphoric, or hydrobromic acids. The catalysts of the prior art have, among other defects, the disadvantage that they produce substantial amounts of by-products, chief among which are acetaldehyde, paraldehyde, monovinylacetylene, and other polymers of acetylene. As a result the yield of vinyl cyanide based on acetylene is not entirely satisfactory, the purification of the vinyl cyanide presents a serious problem, and the formation of the chemically unstable polymers of acetylene in considerable amounts constitutes a hazard well recognized by those skilled in this phase of the art.

This invention has as an object the provision of a process whereby the above disadvantages are decreased. Other objects will appear hereinafter.

These objects are accomplished by the following invention wherein acetylene and hydrogen cyanide are reacted in the presence of an aqueous acidic cuprous chloride complex containing in solution a metallic element of Group V-B of the Periodic System.

In the practice of this invention a mixture of hydrogen cyanide and acetylene in the desired proportion is led into a well agitated acidic solution containing a cuprous salt such as cuprous chloride. Since a high content of soluble cuprous compound is desirable and since cuprous chloride itself is relatively insoluble, it is desirable also to incorporate in the catalyst materials such as those indicated above, which form soluble cuprous complexes. With the specific object of minimizing the formation of by-products, a small amount, 3–15%, by weight, of an oxide of a metal of Group V-B of the Periodic Table is incorporated in the catalyst. A little metallic copper may be added to reduce the cupric salts ordinarily present in cuprous chloride and maintain the soluble copper in the cuprous condition. The reactants should be essentially oxygen-free since the catalyst is readily susceptible to oxidation. A catalyst temperature of 80–90° C. is preferred. The hydrogen cyanide velocity should be approximately one part by weight of hydrogen cyanide for 40–50 parts of cuprous chloride per hour. This condition is important since at higher velocities the conversion of hydrogen cyanide is incomplete, a part appearing in the reaction product, and a part being retained in the catalyst which causes deterioration in its activity. At lower hydrogen cyanide velocities, the space-time yield of vinyl cyanide decreases and the proportion of monovinylacetylene and other products derived from acetylene rises. An excess of acetylene is necessary to insure complete utilization of the hydrogen cyanide, but too great an excess again leads to extensive formation of by-products derived from acetylene. The recommended acetylene/hydrogen cyanide molar ratio is about 6:1.

The warm gases issuing from the catalyst chamber contain vinyl cyanide and unreacted acetylene. Refrigeration of the gases to −15° C., or even as low as −50° C., gives a condensate which consists essentially of vinyl cyanide and water. The uncondensed gas, chiefly acetylene, may be recycled.

The invention is illustrated by, but not limited to, the following exemplifications thereof wherein parts are by weight.

*Example I*

A catalyst was prepared by mixing, in an atmosphere of nitrogen, 376 parts of cuprous chloride, 125 parts of ammonium chloride, 25 parts of bismuth tetroxide, 30 parts of powdered copper metal and 300 parts of water. Concentrated hydrochloric acid was then added until the pH of the mixture dropped to 1.0 to 2.0. The catalyst was then heated to 90° C. with vigorous agitation and a gaseous mixture consisting of 8.0 parts of hydrogen cyanide and 46.2 parts of acetylene was delivered to the bottom of the catalyst chamber. The gaseous products passed upward through a vertical condenser which maintained, from bottom to top, a temperature gradient of about 0° C. to −60° C. The condensate dropped into a separator from which the lower aqueous layer was returned to the catalyst and the upper layer, crude vinyl cyanide, was drawn off. The uncondensed acetylene may be recycled. A period of about 30 to 60 minutes was required for the catalyst to reach equilibrium after which there was produced, per hour, approximately 20 parts of crude vinyl cyanide which on drying and distillation yielded the following:

| Product | Boiling Range, °C | Parts by Weight |
|---|---|---|
| Monovinylacetylene | to 20 | 0.0 |
| Hydrogen cyanide | } 20–30 | 0.4 |
| Acetaldehyde | | 1.0 |
| Vinyl cyanide | 70–78 | 14.6 |

Example II

The catalyst was prepared as in Example I except that 12 parts of arsonic pentoxide was used in place of bismuth tetroxide. The operating procedure was the same as that described in Example I. Distillation of the product after drying showed that there was produced, per hour:

| Product | Boiling Range, °C. | Parts by Weight |
|---|---|---|
| Monovinylacetylene | to 20 | 0.3 |
| Hydrogen cyanide | 20-30 | 0.4 |
| Acetaldehyde | | 1.0 |
| Vinyl cyanide | 70-80 | 15.0 |

To illustrate the improvement obtained by this invention hydrogen cyanide was reacted with acetylene with a catalyst of the prior art under substantially the same optimum operating conditions.

The catalyst was prepared by mixing 376 parts of cuprous chloride, 125 parts of ammonium chloride, 300 parts of water and 30 parts of powdered copper metal in an atmosphere of nitrogen. The catalyst was then heated to 90° C. with good agitation and acidified with concentrated hydrochloric acid to a pH of 2.0 with the aid of a pH meter. A suitable indicator paper could be used. The catalyst was then heated and stirred for an additional hour with further additions of small amounts of acid as required to maintain the desired acidity, a total of about 20 parts of concentrated acid being required. The amount depends upon the purity of the cuprous chloride. The reaction was then conducted exactly as in Example I and there was produced, per hour, approximately 20 parts of crude vinyl cyanide which, on drying and distillation, yielded the following:

| Product | Boiling Range, °C | Parts by Weight |
|---|---|---|
| Monovinylacetylene | to 20 | 0.7 |
| Hydrogen cyanide | 20-30 | 0.2 |
| Acetaldehyde | | 2.0 |
| Vinyl cyanide | 70-80 | 14.9 |

The novelty in the present invention lies in the use of catalysts which contain, in solution, a minor proportion of a metal of Group V—B of the Periodic Table. Thus the catalysts may contain arsenic, antimony, or bismuth and the valency exhibited by the element does not appear to be critical. Thus, either arsenic pentoxide or trioxide may be used or bismuth trioxide or pentoxide. The oxides may be more or less completely converted to chlorides or other salts in the catalyst and in fact it has been observed that chlorides and the metals of Group V—B may be used in place of the oxides.

The temperature range is 80-90° C. At both lower and higher temperatures the rate of conversion to vinyl cyanide is appreciably lower. Control, within narrow limits, of the hydrogen cyanide velocity and acetylene hydrogen cyanide ratio is an important factor governing the performance of the catalyst. The hydrogen cyanide velocity is 0.020-0.030 part by weight per part of cuprous chloride per hour, and the acetylene/hydrogen cyanide mol. ratio is 5/1 to 7/1.

The invention is described above in specific embodiments but is not limited thereto. It is to be construed broadly and restricted solely by the scope of the following claims.

What is claimed is:

1. In a liquid phase process for the preparation of vinyl cyanide by reacting acetylene and hydrogen cyanide in an acidic aqueous solution of cuprous chloride containing a solubilizer of the class consisting of ammonium chloride, alkali metal chlorides, and amine hydrochlorides at a velocity of 0.02 to 0.03 part by weight of hydrogen cyanide per part of cuprous chloride the improvement wherein the cuprous chloride solution contains 3-15%, by weight of the cuprous chloride, of an oxide of an element of the class consisting of arsenic and bismuth.

2. In a liquid phase process for the preparation of vinyl cyanide by reacting acetylene and hydrogen cyanide in an aqueous acidic solution of cuprous chloride containing a solubilizer of the class consisting of ammonium chloride, alkali metal chlorides, and amine hydrochlorides at a velocity of 0.02 to 0.03 part by weight of hydrogen cyanide per part of cuprous chloride the improvement wherein the cuprous chloride solution contains bismuth.

3. Process for preparing vinyl cyanide which comprises reacting hydrogen cyanide with acetylene in the presence of aqueous acidic cuprous chloride solution containing a solubilizer of the class consisting of ammonium chloride, alkali metal chlorides, and amine hydrochlorides and 3-15%, by weight of the cuprous chloride, of an oxide of a Group V—B element of the class consisting of arsenic and bismuth the hydrogen cyanide being brought in contact with the catalyst solution at a temperature of 80-90° C., at a velocity of 0.02 to 0.03 part by weight of hydrogen cyanide per part of cuprous chloride, and at a ratio of 5 to 7 parts of acetylene per part of hydrogen cyanide.

4. Process of claim 3 wherein the Group V—B element is bismuth.

5. In a process for the preparation of vinyl cyanide by reacting acetylene and hydrogen cyanide in an aqueous acidic solution of cuprous chloride, said solution also containing a salt of the class consisting of ammonium, amine and alkali metal salts, the improvement wherein the cuprous chloride solution contains bismuth.

PAUL LAWRENCE SALZBERG.

REFERENCES CITED

The following references are of record in the file of this patent:

UNITED STATES PATENTS

| Number | Name | Date |
|---|---|---|
| 1,934,324 | Perkins | Nov. 7, 1933 |
| 1,919,886 | Hermann et al. | July 25, 1933 |
| 2,322,696 | Kurtz et al. | June 22, 1943 |
| 2,385,327 | Bradley et al. | Sept. 25, 1945 |
| 2,385,469 | Salley | Sept. 25, 1945 |
| 2,385,470 | Salley et al. | Sept. 25, 1945 |

FOREIGN PATENTS

| Number | Country | Date |
|---|---|---|
| 217,478 | Switzerland | Feb. 2, 1942 |

Certificate of Correction

Patent No. 2,476,771 July 19, 1949

PAUL LAWRENCE SALZBERG

It is hereby certified that errors appear in the printed specification of the above numbered patent requiring correction as follows:

Column 3, line 3, for "arsonic" read *arsenic*; line 59, for the words "and the" read *of the*; line 66, for "acetylene hydrogen" read *acetylene/hydrogen*; and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*